US011437651B2

United States Patent
Eom et al.

(10) Patent No.: US 11,437,651 B2
(45) Date of Patent: Sep. 6, 2022

(54) STACKED ELECTRODE ASSEMBLY AND FLEXIBLE RECHARGEABLE BATTERY COMPRISING THE SAME

(71) Applicant: Samsung SDI Co., Ltd., Yongin-si (KR)

(72) Inventors: Hyeri Eom, Yongin-si (KR); Jeongdoo Yi, Yongin-si (KR); Juhee Sohn, Yongin-si (KR); Da-Un Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 69 days.

(21) Appl. No.: 16/330,223

(22) PCT Filed: Sep. 5, 2017

(86) PCT No.: PCT/KR2017/009671
§ 371 (c)(1),
(2) Date: Mar. 4, 2019

(87) PCT Pub. No.: WO2018/048165
PCT Pub. Date: Mar. 15, 2018

(65) Prior Publication Data
US 2019/0252726 A1     Aug. 15, 2019

(30) Foreign Application Priority Data

Sep. 6, 2016   (KR) .................. 10-2016-0114632

(51) Int. Cl.
*H01M 10/04*    (2006.01)
*H01M 10/0583*  (2010.01)
(Continued)

(52) U.S. Cl.
CPC ..... *H01M 10/0583* (2013.01); *H01M 10/045* (2013.01); *H01M 10/0459* (2013.01); *H01M 50/463* (2021.01); *H01M 50/538* (2021.01)

(58) Field of Classification Search
CPC ......... H01M 10/0431; H01M 10/0583; H01M 50/463; H01M 50/538; H01M 10/045; H01M 10/0459
See application file for complete search history.

(56) References Cited

U.S. PATENT DOCUMENTS

| | | |
|---|---|---|
| 2002/0160263 A1 | 10/2002 | Corrigan et al. |
| 2010/0015529 A1 | 1/2010 | Kim et al. |

(Continued)

FOREIGN PATENT DOCUMENTS

| | | |
|---|---|---|
| CN | 102055004 A | 5/2011 |
| CN | 103490089 A | 1/2014 |

(Continued)

OTHER PUBLICATIONS

Japanese Office Action dated Dec. 23, 2019, for corresponding Japanese Patent Application No. 2019-512604 (4 pages).

(Continued)

*Primary Examiner* — Milton I Cano
*Assistant Examiner* — Jenna Shulman
(74) *Attorney, Agent, or Firm* — Lewis Roca Rothgerber Christie LLP

(57) ABSTRACT

The present disclosure relates to a stacked electrode assembly and a flexible rechargeable battery including the same, including a first electrode, a second electrode stacked on one surface or both surfaces of the first electrode, and a separator disposed between the first electrode and the second electrode, wherein the separator has a continuous sheet shape, is bent in a first direction to surround the first electrode and in a second direction as an opposite direction to the first (Continued)

direction to surround the second electrode, and a bending end region of the separator includes a plurality of patterns.

5 Claims, 10 Drawing Sheets

(51) Int. Cl.
*H01M 50/463* (2021.01)
*H01M 50/538* (2021.01)

(56) References Cited

U.S. PATENT DOCUMENTS

| | | | |
|---|---|---|---|
| 2011/0104567 A1 | 5/2011 | Lee | |
| 2012/0058387 A1* | 3/2012 | Ahn | H01M 2/0275 429/163 |
| 2012/0121965 A1* | 5/2012 | Makino | H01M 4/70 429/156 |
| 2012/0121967 A1 | 5/2012 | Nakamura et al. | |
| 2012/0189894 A1* | 7/2012 | Ahn | H01M 10/0459 429/135 |
| 2013/0083496 A1 | 4/2013 | Franklin et al. | |
| 2014/0050957 A1 | 2/2014 | Yang | |
| 2014/0272537 A1 | 9/2014 | Kretschmar et al. | |
| 2014/0342215 A1 | 11/2014 | Kwon et al. | |

FOREIGN PATENT DOCUMENTS

| | | |
|---|---|---|
| CN | 103827771 A | 5/2014 |
| CN | 203800123 U | 8/2014 |
| CN | 104106169 A | 10/2014 |
| CN | 105655629 A | 6/2016 |
| JP | 2007-305464 A | 11/2007 |
| JP | 2013-254629 A | 12/2013 |
| JP | 2015-503832 A | 2/2015 |
| JP | 2015-57788 A | 3/2015 |
| KR | 2000-0051741 A | 8/2000 |
| KR | 10-2004-0092105 A | 11/2004 |
| KR | 10-0907623 B1 | 7/2009 |
| KR | 10-2010-0084326 A | 7/2010 |
| KR | 10-2012-0082580 A | 7/2012 |
| KR | 10-2013-0008883 A | 1/2013 |
| KR | 10-2014-0014839 A | 2/2014 |
| KR | 10-2015-0040454 A | 4/2015 |
| KR | 10-2015-0128063 A | 11/2015 |
| KR | 10-2015-0137077 A | 12/2015 |
| KR | 10-2016-0090108 A | 7/2016 |
| WO | WO 2004/097971 A1 | 11/2004 |
| WO | 2012/020480 A1 | 2/2012 |
| WO | WO-2013151233 A1 * | 10/2013 ........ H01M 10/0459 |

OTHER PUBLICATIONS

Extended European Search Report for corresponding European Patent Application No. 17849049.6, dated Apr. 3, 2020, 7 pages.
Japanese Patent Office Notice of Allowance with English Translation for corresponding Japanese Patent Application No. 2019-512604, dated Jul. 13, 2020, 5 pages.
Chinese Office Action dated May 31, 2021 regarding Chinese Patent Application No. 201780054344.2 corresponding to U.S. Appl. No. 16/330,223 (8 pages) with English Translation (9 pages).

* cited by examiner

STACKED ELECTRODE ASSEMBLY AND FLEXIBLE RECHARGEABLE BATTERY COMPRISING THE SAME

CROSS-REFERENCE TO RELATED APPLICATION(S)

This application is a National Phase Patent Application of International Patent Application Number PCT/KR2017/009671, filed on Sep. 5, 2017, which claims priority of Korean Patent Application No. 10-2016-0114632, filed Sep. 6, 2016. The entire contents of both of which are incorporated herein by reference.

TECHNICAL FIELD

The present invention relates to a stacked electrode assembly and a flexible rechargeable battery including the same.

BACKGROUND ART

In recent years, attention has been focused on development and commercial availability of flexible electronic devices such as flexible displays, wearable mobile phones, and watches. Therefore, there is a growing demand for realizing a flexible characteristic for a rechargeable battery, which is a power supply for such a flexible electronic device.

In general, the rechargeable battery includes an electrode assembly including a positive electrode, a negative electrode, and a separator interposed between the positive electrode and the negative electrode.

There have been various attempts to apply the electrode assembly having a stacked structure to a flexible rechargeable battery because flexibility is realized without damage to the electrode plate in order to realize a flexible characteristic in a rechargeable battery including such an electrode assembly.

DISCLOSURE

Technical Problem

The present disclosure provides a stacked electrode assembly in which flexibility is remarkably improved.

The present disclosure also provides a flexible rechargeable battery including the stacked electrode assembly.

Technical Solution

The present disclosure provides a stacked electrode assembly including a first electrode, a second electrode stacked on one surface or both surfaces of the first electrode, and a separator disposed between the first electrode and the second electrode, wherein the separator has a continuous sheet shape, is bent in a first direction to surround the first electrode and in a second direction as an opposite direction to the first direction to surround the second electrode, and a bending end region of the separator includes a plurality of patterns.

The present disclosure also provides a flexible rechargeable battery including the stacked electrode assembly and a case receiving the same.

Advantageous Effects

The stacked electrode assembly and the flexible secondary battery including the stacked electrode assembly according to an exemplary embodiment of the present disclosure may remarkably improve bending characteristics by uniformly dispersing stress applied to the electrode assembly during bending.

MODE FOR INVENTION

Figure 1:
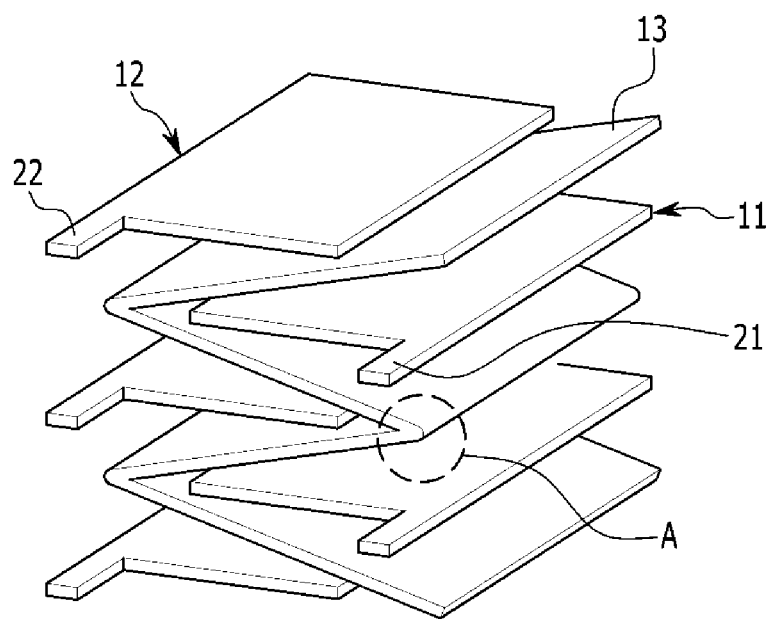
FIG. 1 is an exploded perspective view of a stacked electrode assembly according to an exemplary embodiment of the present disclosure.

Hereinafter, the present invention will be described more fully hereinafter with reference to the accompanying drawings, in which exemplary embodiments of the invention are shown. The present invention may be implemented in various ways, and is not limited to the exemplary embodiments described herein.

Parts that are unrelated to the description of the exemplary embodiments are not shown to make the description clear, and like reference numerals designate like element throughout the specification.

The size and thickness of the configurations are optionally shown in the drawings for convenience of description, and the present invention is not limited to as shown in the drawings.

In addition, unless explicitly described to the contrary, the word "comprise" and variations such as "comprises" or "comprising" will be understood to imply the inclusion of stated elements but not the exclusion of any other elements.

Figure 2:
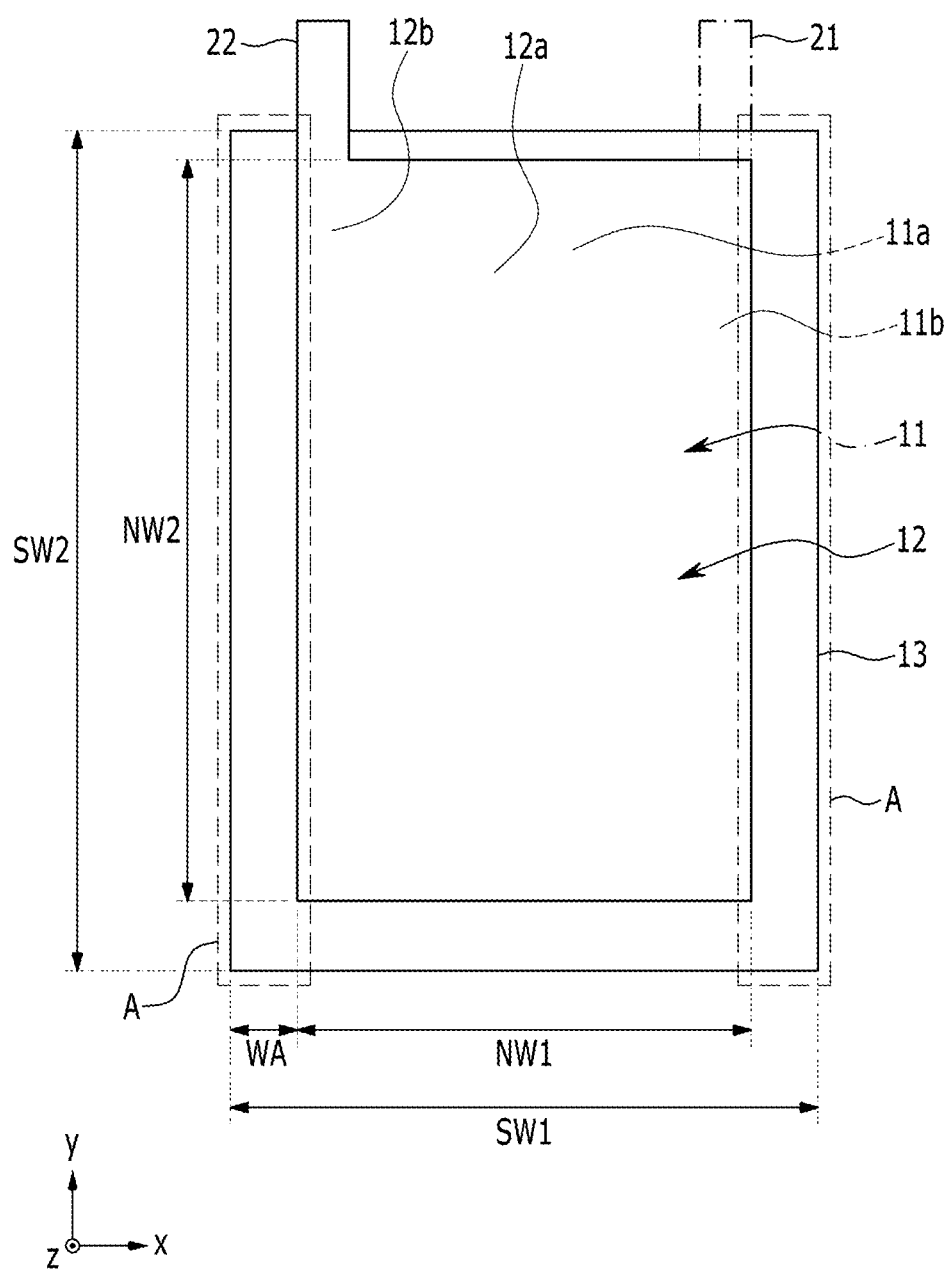
FIG. 2 is a horizontal cross-sectional view of a stacked electrode assembly according to FIG. 1.
Figure 3:
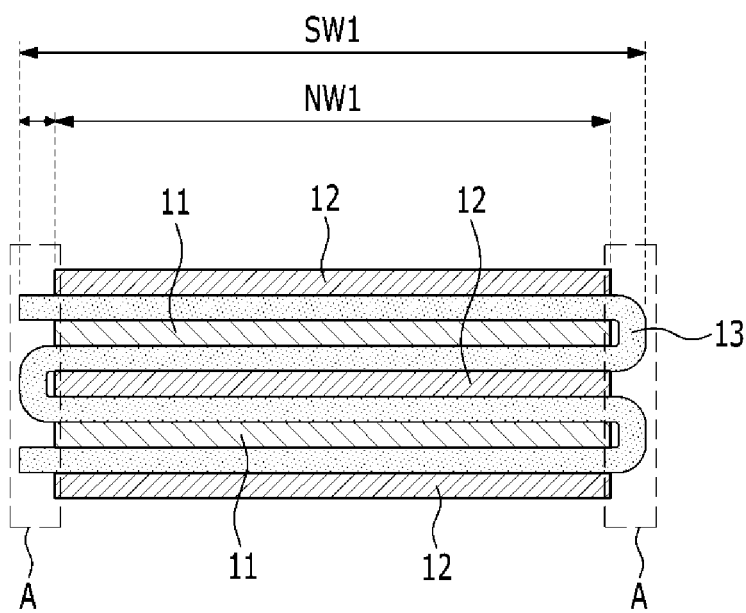
FIG. 3 is a vertical cross-sectional view of a stacked electrode assembly according to FIG. 1.
Figure 3:
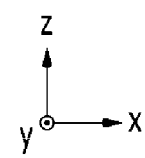

FIG. 1 is an exploded perspective view of a stacked electrode assembly according to an exemplary embodiment of the present disclosure, FIG. 2 is a horizontal cross-sectional view of a stacked electrode assembly according to FIG. 1, and FIG. 3 is a vertical cross-sectional view of a stacked electrode assembly according to FIG. 1.

Referring to FIG. 1 to FIG. 3, a stacked electrode assembly 10 according to an exemplary embodiment of the present disclosure includes a first electrode 11, a second electrode 12, and a separator 13 disposed between the first electrode 11 and the second electrode 12.

In the present disclosure, the separator 13 is characterized by having a continuous sheet shape.

Further, the separator 13 may be bent in a first direction to surround the first electrode 11, and may be bent in a second direction which is opposite to the first direction to surround the second electrode 12.

Referring to FIG. 1, the separator 13 of the continuous sheet shape is alternately bent in the first direction and the second direction opposite thereto. Thus, in the stacked electrode assembly 10, the vertical cross-section of the separator 13 may have a zigzag shape.

The first electrode 11 is disposed inside the separator 13 bent in the first direction and the second electrode 12 is disposed inside the separator 13 bent in the second direction.

When the first electrode 11 and the second electrode 12 are included in a plural number, the first electrode 11 and the second electrode 12 are alternately stacked.

Referring to FIG. 2, the separator 13 of the present disclosure is bent to have a larger size than the first electrode 11 or the second electrode 12 when viewed from the horizontal cross-section (an xy direction) of the electrode assembly 10.

In detail, the short side width SW1 of the separator 13 is larger than the short side width NW1 of the second electrode 12, and the long side width SW2 of the separator 13 is larger than the long side width NW2 of the second electrode 12.

FIG. 2 shows only the short side and long side widths NW1 and NW2 of the second electrode 12 for convenience, but the short side and long side widths of the first electrode 11 may be formed to be the same as the short side and long side widths NW1 and NW2 of the second electrode 12.

Referring to FIG. 2 and FIG. 3, the electrode assembly 10 has a shape including a pair of short sides and a pair of long sides.

Since the separator 13 of the present disclosure is formed to be bent and has a larger size than the first electrode 11 and the second electrode 12, the separator 13 does not overlap the first electrode 11 and the second electrode 12 on the side of the long side of the electrode assembly 10 and has a region where the separators 13 are overlapped with each other.

In the present disclosure, a region in which the separators 13 folded in the end region where the separator 13 is bent are overlapped with each other is referred to as a bending end region A.

The short width WA of the bending end region A may be 5% to 10% of the short side width NW1 of the first electrode 11 or the short side width NW1 of the second electrode 12, and in detail, 7% to 8%. When the short width WA of the bending end region A satisfies the above range based on the short side width NW1 of the first electrode 11 or the short side width NW1 of the second electrode 12, in the electrode assembly 10, a battery preventing a short between the positive electrode and the negative electrode and simultaneously having high energy density may be realized.

The present disclosure is characterized by including a plurality of patterns in the bending end region A.

FIG. 4 to FIG. 8 are views illustrating various types of patterns included in the bending end region.

Figure 4:
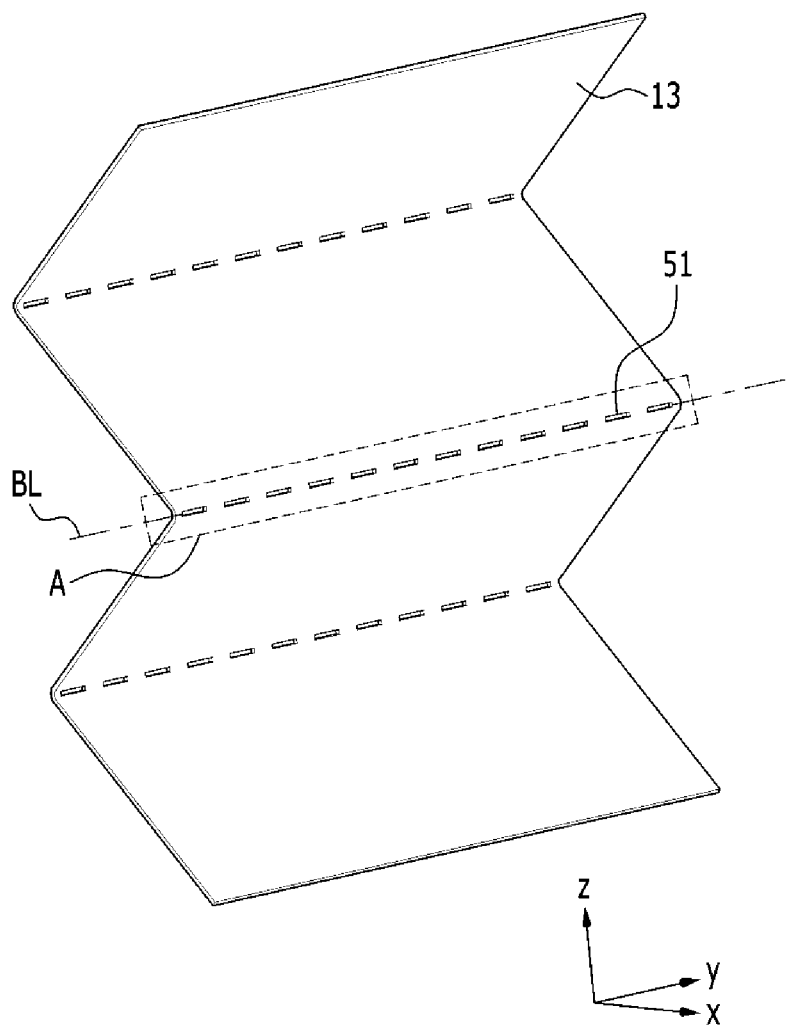
FIG. 4 to FIG. 8 are views illustrating various types of patterns included in the bending end region.
Figure 5:
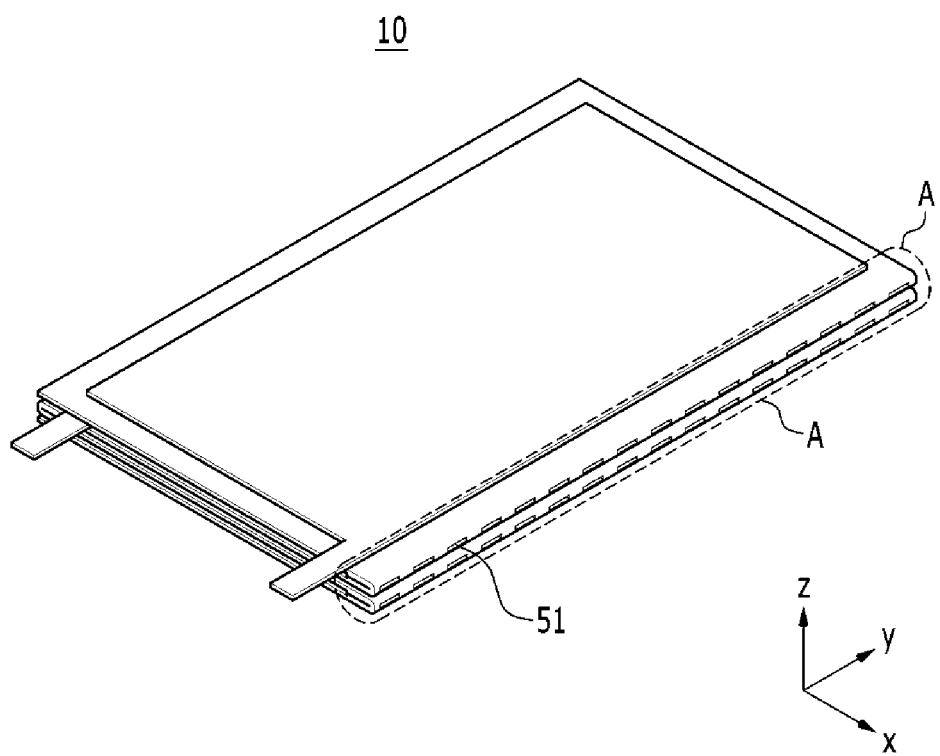

First, referring to FIG. 4 and FIG. 5, the separator 13 may be bent along a bending line BL, and the bending end region A may include a plurality of patterns arranged along the bending line BL.

The plurality of patterns may be a linear pattern 51 arranged at a predetermined interval along the bending line BL. The linear pattern 51 may be formed to penetrate the separator 13.

In addition, the process of forming the linear pattern 51 may be performed before alternately stacking the first electrode 11 and the second electrode 12 on the separator 13 bent with the zigzag shape or after alternately stacking the first electrode 11 and the second electrode 12.

That is, the linear pattern 51 may be firstly formed in the bending end region A of the separator 13 and then the first electrode 11 and the second electrode 12 may be alternately formed, and the first electrode 11 and the second electrode 12 may be alternately stacked inside the separator 13 bent with the zigzag shape to form the electrode assembly 10 and then the linear pattern 51 may be formed.

However, when the linear pattern 51 is firstly formed and then the first electrode 11 and the second electrode 12 are stacked, there is a merit that the linear pattern 51 may be easily formed in the bending end region A of the separator 13.

The linear pattern 51 may be formed by, for example, a method of punching it by using jig along a previously cut bending line BL, or using laser cutting.

Figure 6:
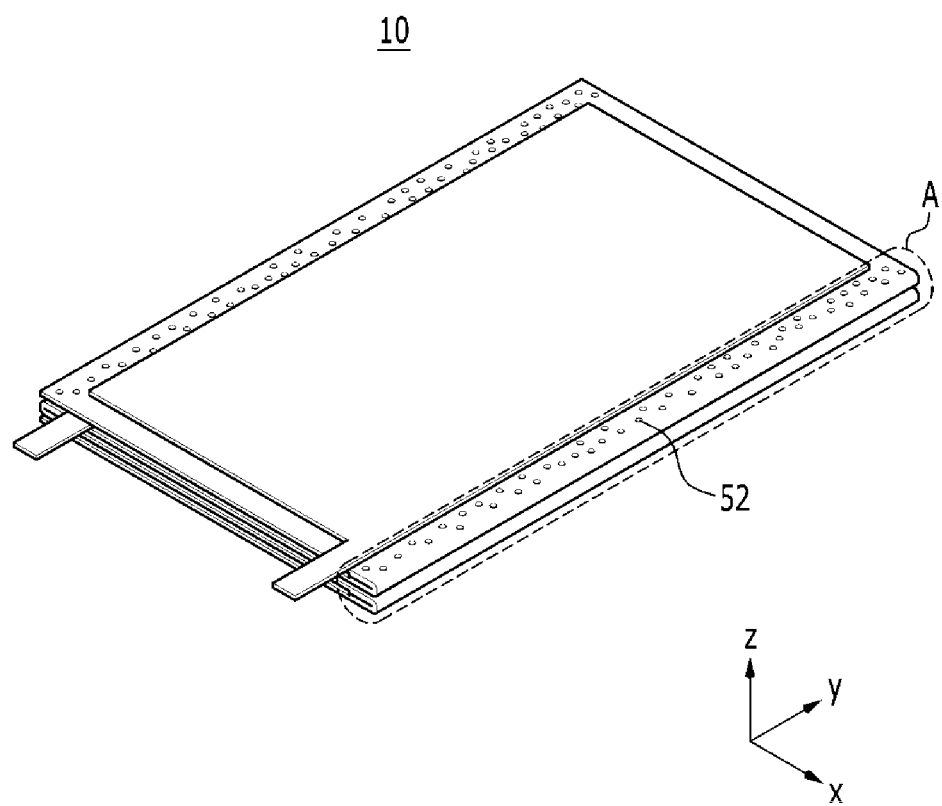

Referring to FIG. 6, a plurality of patterns disposed in the bending end region A may be a plurality of circular patterns 52.

Although not shown, a plurality of patterns may be at least one of elliptical, triangle, quadrangle, and polygon shapes in addition to the circular pattern 52, or a shape in which a plurality of such shapes are mixed may be included in plural. At this time, the plurality of patterns may be formed to pass through the separator 13.

The plurality of circular patterns 52 may be formed by appropriately adjusting the spacing in a range that does not affect the performance of the electrode assembly 10 even if the separator 13 is damaged so that the flexible characteristic may be realized.

The process of forming a plurality of patterns may be performed before alternately stacking the first electrode 11 and the second electrode 12 on the separator 13 bent with the zigzag shape or after alternately stacking the first electrode 11 and the second electrode 12.

That is, a plurality of patterns may be first formed in the bending end region A of the separator 13 and then the first electrode 11 and the second electrode 12 may be alternately stacked, or the first electrode 11 and the second electrode 12 may be alternately stacked in the separator 13 bent with the zigzag shape to form the electrode assembly 10 and then a plurality of patterns may be formed.

However, when a plurality of patterns are first formed and the first electrode 11 and the second electrode 12 are stacked, there is a process advantage that a pattern of various shapes may be easily formed in the bending end region A of the separator 13.

At this time, a plurality of patterns may be formed by, for example, a method of punching or a method of laser cutting.

Figure 7:
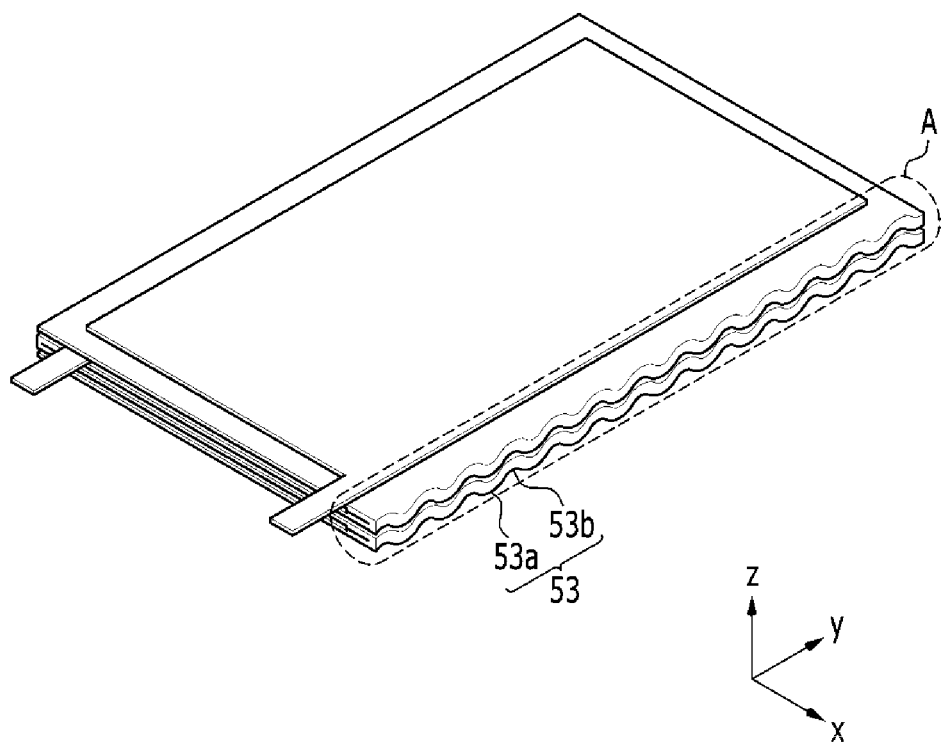

Referring to FIG. 7, a plurality of patterns may be a protrusions and depressions pattern 53.

The protrusions and depressions pattern 53 may be formed to include a plurality of recess portions 53a recessed in the z-axis direction and a plurality of convex portions 53b protruded in the z-axis direction, as viewed from the vertical cross-section of the electrode assembly 10.

The process of forming the protrusions and depressions pattern 53 may be performed before alternately stacking the first electrode 11 and the second electrode 12 on the separator 13 bent with the zigzag shape, or after alternately stacking the first electrode 11 and the second electrode 12.

In other words, the protrusions and depressions pattern 53 may be first formed in the bending end region A of the separator 13 and then the first electrode 11 and the second electrode 12 may be alternately stacked, or the first electrode 11 and the second electrode 12 may be stacked inside the separator 13 bent with the zigzag shape to form the electrode assembly 10 and then the protrusions and depressions pattern 53 may be formed.

However, if the protrusions and depressions pattern 53 are first formed on the bent separator 13 and the first electrode 11 and the second electrode 12 are stacked, there is a process advantage that the protrusions and depressions pattern 53 may be easily formed in the bending end region A of the separator 13.

The protrusions and depressions pattern 53 may be formed, for example, by rolling it at room temperature or at a high temperature of 70° C. or less using jigs with protrusions and depressions.

Figure 8:
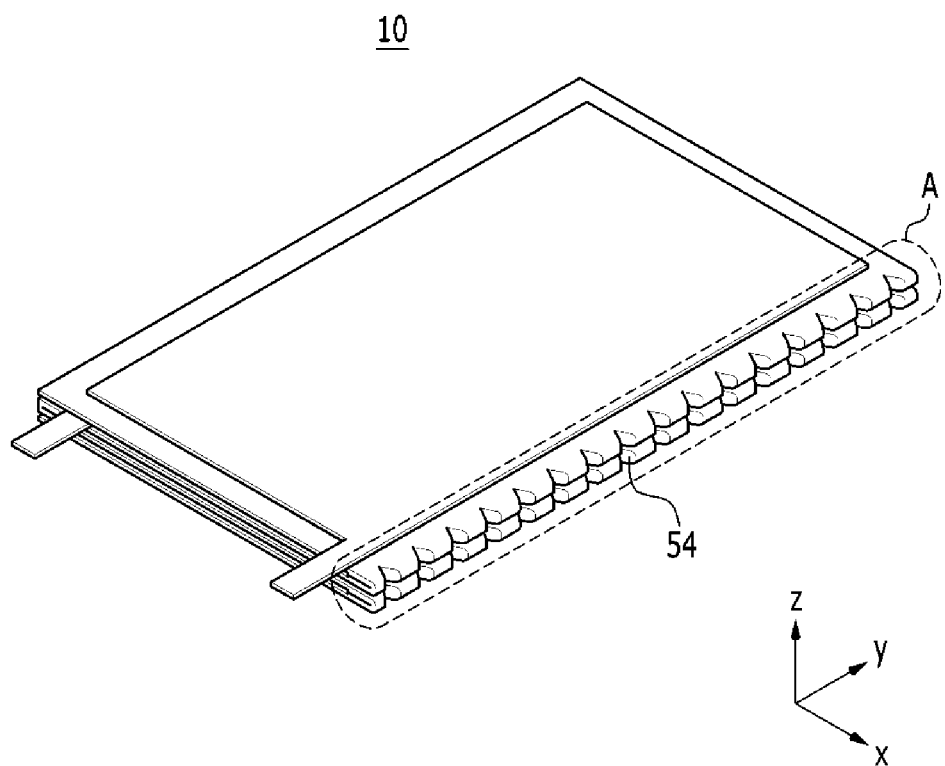

Referring to FIG. 8, a plurality of patterns may include a plurality of fracture portions 54.

The plurality of fracture portions 54 may be disposed along the bending line BL of the bending end region A.

Also, a plurality of fracture portions 54 means to be formed in the xy plane when viewed from the horizontal cross-section of the electrode assembly 10. That is, a plurality of fracture portions 54 may be formed of a shape in which a part of the separator 13 is removed along the bending line BL disposed at the long side end of the electrode assembly 10.

In FIG. 8, the plurality of fracture portions 54 are formed to be triangular, but the plurality of fracture portions 54 may have at least one shape of a quadrangle, a semicircle, and a semi-ellipse in addition to the triangle, or may be formed of mixed shapes thereof.

Also, the process of forming the plurality of fracture portions 54 may be performed before alternately stacking the first electrode 11 and the second electrode 12 in the separator 13 bent with the zigzag shape, or after alternately stacking the first electrode 11 and the second electrode 12.

In other words, a plurality of fracture portions 54 may be first formed in the bending end region A of the separator 13 and then the first electrode 11 and the second electrode 12 may be alternately stacked, or the first electrode 11 and second electrode 12 may be stacked in the separator 13 bent with the zigzag shape to form the electrode assembly 10 and then then plurality of fracture portions 54 may be formed.

However, when the plurality of fracture portions 54 are first formed and the first electrode 11 and the second electrode 12 are stacked, there is a process advantage that the plurality of fracture portions 54 may be easily formed in the bending end region A of the separator 13.

Further, the plurality of fracture portions 54 may be formed by, for example, a method of punching by using a jig or a method of laser cutting.

Further, the thickness of the separator 13 in the present disclosure may be, for example, 10 μm to 20 μm. More specifically, the thickness of the separator 13 may be 12 μm to 18 μm, or 14 μm to 16 μm. When the thickness of the separator 13 satisfies the above numerical range, the bending process of the separator 13 may be performed smoothly, and the electrode assembly 10 may be thinned according to the present disclosure in which the bending characteristic is improved.

Further, in the present disclosure, the first electrode 11 may be a positive electrode and the second electrode 12 may be a negative electrode, but in some cases, the first electrode 11 may be the negative electrode and the second electrode 12 may be the positive electrode. Hereinafter, for convenience, an example in which the first electrode 11 is the positive electrode and the second electrode 12 is the negative electrode is described.

The first electrode 11 includes a coated region 11a coated with a positive active material on the current collector of a thin metal plate, and an uncoated region 11b configured with the exposed current collector that is not coated with the positive active material. For example, the current collector and a first electrode tab 21 of the first electrode 11 may be formed of aluminum (Al).

The second electrode 12 includes a coated region 12a coated with a negative active material on the current collector of a thin metal plate, and an uncoated region 12b configured with the exposed current collector on which the negative active material is not coated. For example, the current collector of the second electrode 12 and a second electrode tab 22 may be formed of copper (Cu).

In the present disclosure, the coated regions 11a and 12a may be formed on both surfaces of the first electrode 11 and the second electrode 12. However, in the case of the first electrode 11 and/or the second electrode 12 disposed outermost of the electrode assembly 10, it is preferable that the coated regions 11a and 12a are not formed at the portion contacting the case when considering the energy density and the thinning of the electrode assembly 10.

In the stacked state, the first electrode 11 and the second electrode 12 are alternately arranged in both sides of the width direction (a y-axis direction) of the uncoated regions 11b and 12b. That is, in FIG. 2, the uncoated region 11b of the first electrode 11 is disposed to the right and the uncoated region 12b of the second electrode 12 is disposed to the left.

Also, the first electrode tab 21 is connected to the uncoated region 11b of the first electrode 11 and the second electrode tab 22 is connected to the uncoated region 12b of the second electrode 12. Therefore, the first and second electrode tabs 21 and 22 are spaced apart from each other at a predetermined interval outside one side of the case 120. The first and second electrode tabs 21 and 22 may be welded to the uncoated regions 11b and 12b or may be formed by extending the uncoated regions 11b and 12b to serve the function of the first and second electrode tabs 21 and 22.

Since the electrode assembly 10 according to the present disclosure includes a plurality of patterns 51, 52, 53, and 54 formed in various shapes in the bending end region A of the separator 13, when bending the electrode assembly 10, a tensile stress and a compression stress applied to the outside and inside of the electrode assembly 10 may be uniformly dispersed, thereby realizing an excellent flexibility characteristic.

Next, the configuration of the flexible rechargeable battery according to an exemplary embodiment of the present disclosure will be described.

Figure 9:
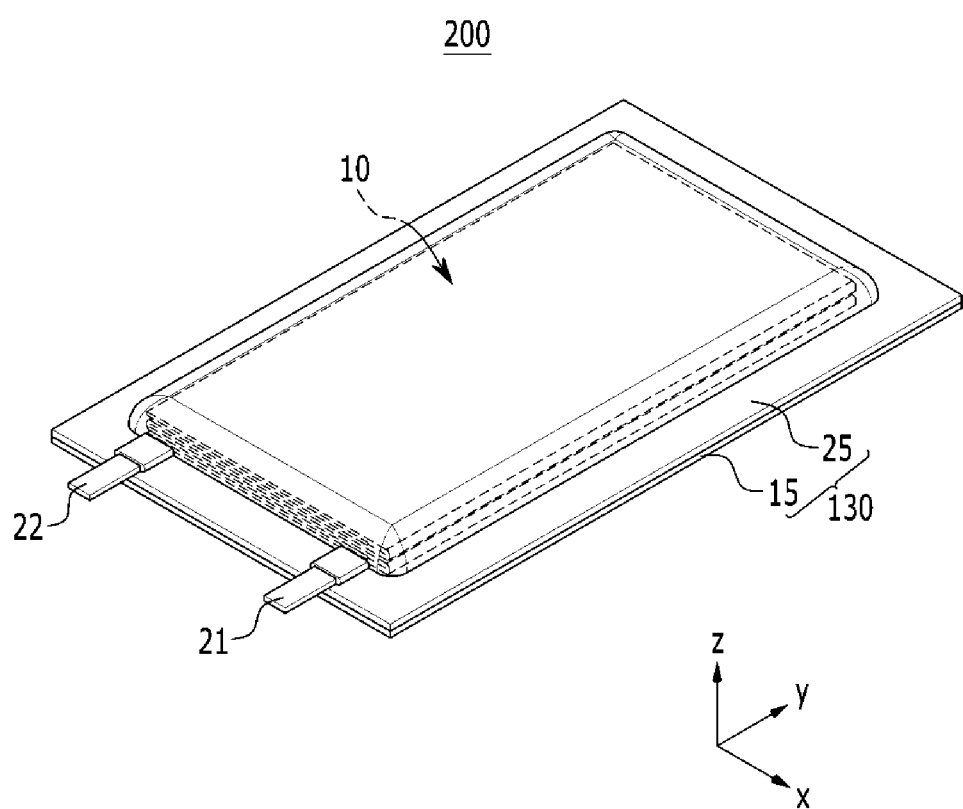
FIG. 9 is a perspective view of a flexible rechargeable battery according to an exemplary embodiment of the present disclosure.
Figure 10:
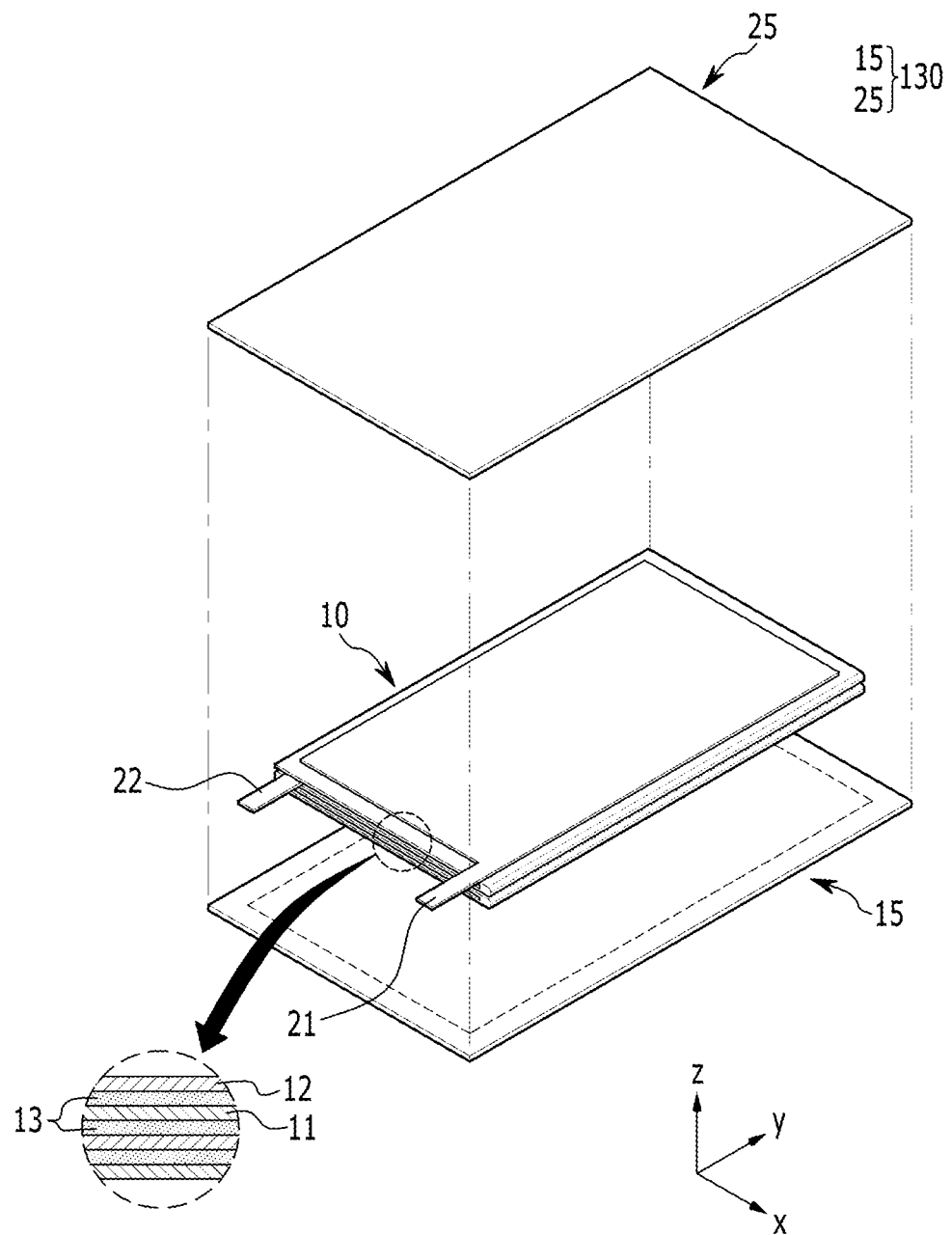
FIG. 10 is an exploded perspective view of a flexible rechargeable battery according to FIG. 9.

FIG. 9 is a perspective view of a flexible rechargeable battery according to an exemplary embodiment of the present disclosure, and FIG. 10 is an exploded perspective view of a flexible rechargeable battery according to FIG. 9.

Referring to FIG. 9 and FIG. 10, another flexible rechargeable battery 200 according to an exemplary embodiment of the present disclosure includes the above-described stacked electrode assembly 10 and a case 130 receiving them.

In this instance, the case 130 may include an upper case 25 and a lower case 15. The upper case 25 and the lower case 15 accommodate the stacked electrode assembly 10 and form the flexible rechargeable battery by joining the edges thereof together by heat fusion or the like.

The first electrode tab 21 and second electrode tab 22 may be drawn out of the case 130 and electrically connected to a set of protective circuit modules (not shown) and electronic devices. Here, the first and second electrode tabs 21 and 22 may be drawn out to one side of the upper case 25 and the lower case 15 by interposing an electrical insulation member.

Meanwhile, each of the upper case 25 and the lower case 15 may have a structure in which an outer resin layer, a metal layer, and an inner resin layer are sequentially stacked, as an example.

First, the outer resin layer serves as a base substrate and a protective layer. The outer resin layer, for example, may be formed of one or more selected from a group including polyethylene terephthalate, polybutylene terephthalate, polyethylene naphthalate, polybutylene naphthalate, a polyester copolymer, a polycarbonate, and a nylon film, but is not limited thereto.

Next, the metal layer may prevent moisture and the like from penetrating the flexible rechargeable battery 200 according to the present disclosure.

The metal layer may be made of, for example, at least one material selected from a group including alloys of Fe, C, Cr, and Mn, alloys of Fe, C, Cr, and Ni, Cu, Al, or their equivalents, but is not limited thereto.

Also, the metal layer is preferably formed as thick as possible in a range that does not impair the flexibility of the flexible rechargeable battery 200, from the viewpoint of the effect of preventing moisture permeation.

Next, the inner resin layer also serves to bond the separator 13 or the cross-section of the first electrode 11 or the second electrode 12, which is not coated with the active material. In some cases, the inner resin layer may serve to directly bond the edges of the upper case 25 and the lower case 15 without additional adhesives.

The inner resin layer, for example, may be formed of a polyolefin or a copolymer of a polyolefin, and more specifically, the polyolefin may be polyethylene (PE) or polypropylene (PP), but is not limited thereto.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

200: rechargeable battery
10: electrode assembly
21: positive electrode tab
22: negative electrode tab
130: case
25: upper case
15: lower case
11: positive electrode
11*a*: positive coated region
11*b*: positive uncoated region
12: negative electrode
12*a*: negative coated region
12*b*: negative uncoated region
13: separator

The invention claimed is:

1. A stacked electrode assembly comprising:
a first electrode comprising a first tab extending from one side;
a second electrode stacked on one surface or both surfaces of the first electrode, the second electrode comprising a second tab extending from one side; and
a separator disposed between the first electrode and the second electrode,
wherein the separator has a continuous sheet shape, is bent in a first direction to surround the first electrode and in a second direction as an opposite direction to the first direction to surround the second electrode, and
a bending end region of the separator includes a plurality of patterns,
wherein the plurality of patterns include a protrusions and depressions pattern including a plurality of recess portions and a plurality of convex portions.

2. The stacked electrode assembly of claim 1, wherein the plurality of patterns are arranged along a bending line of the bending end region.

3. The stacked electrode assembly of claim 1, wherein the bending end region does not overlap the first electrode and the second electrode.

4. The stacked electrode assembly of claim 1, wherein a thickness of the separator is 10 μm to 20 μm.

5. A flexible rechargeable battery comprising:
the stacked electrode assembly of claim 1; and
a case receiving the stacked electrode assembly.

* * * * *